Jan. 21, 1969  F. J. NESSLINGER ET AL  3,422,976
MATERIAL HANDLING APPARATUS
Filed March 7, 1967  Sheet 4 of 4
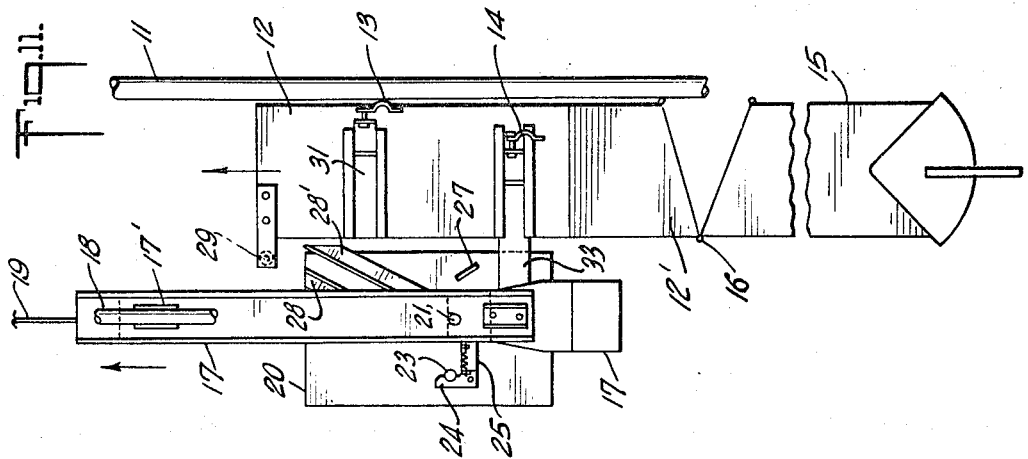
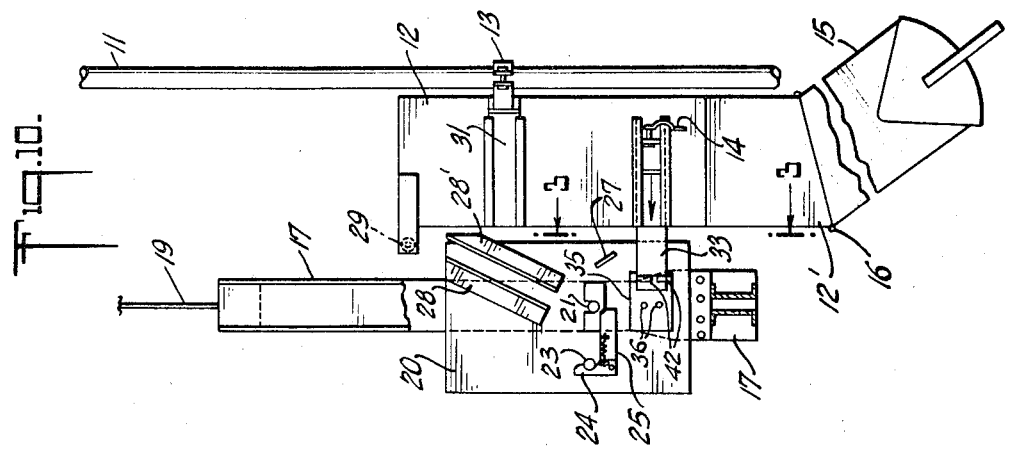
INVENTORS:
ARTHUR C. BORGMAN
FRITZ J. NESSLINGER
BY
Curtis, Morris & Safford
ATTORNEYS.

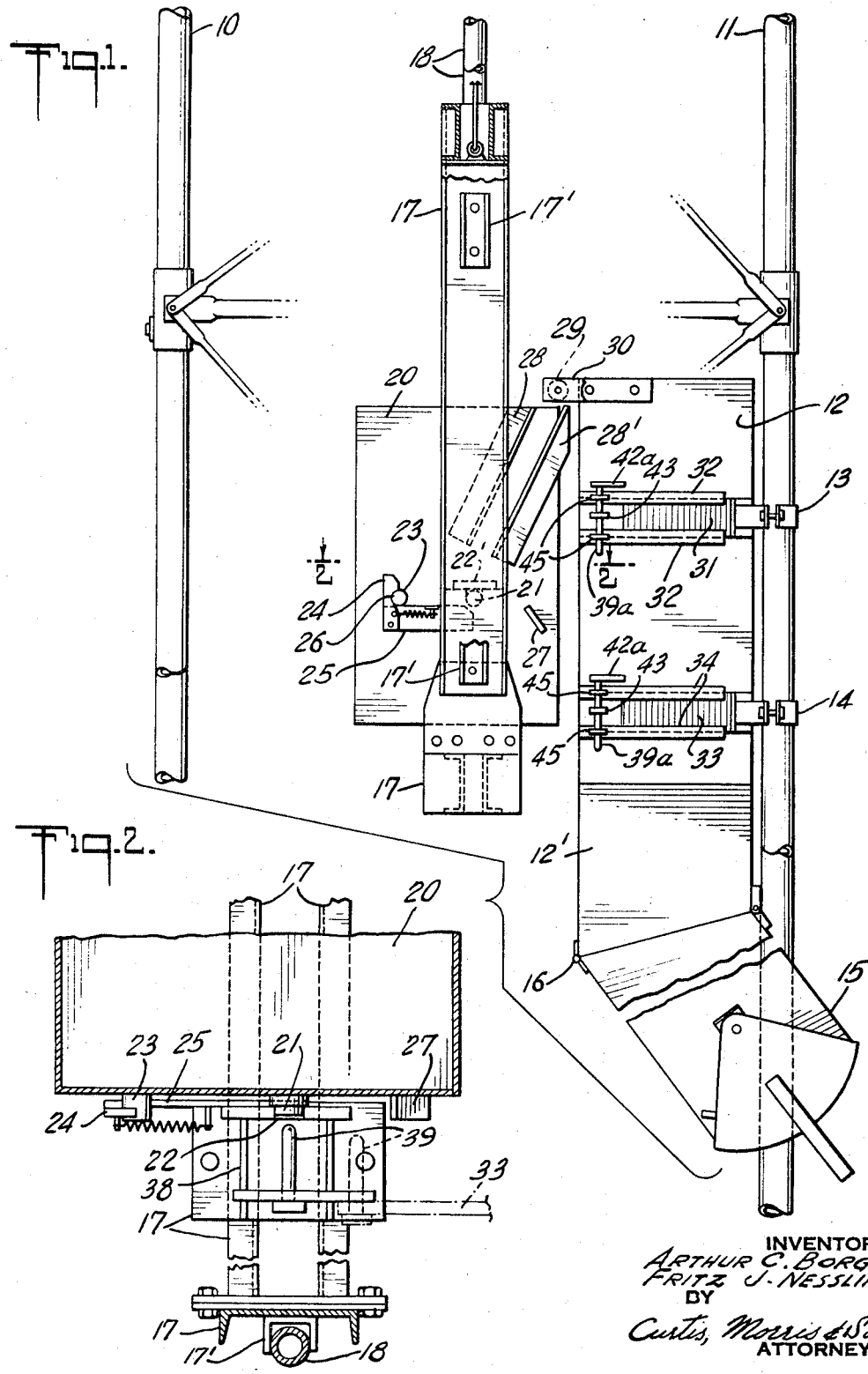

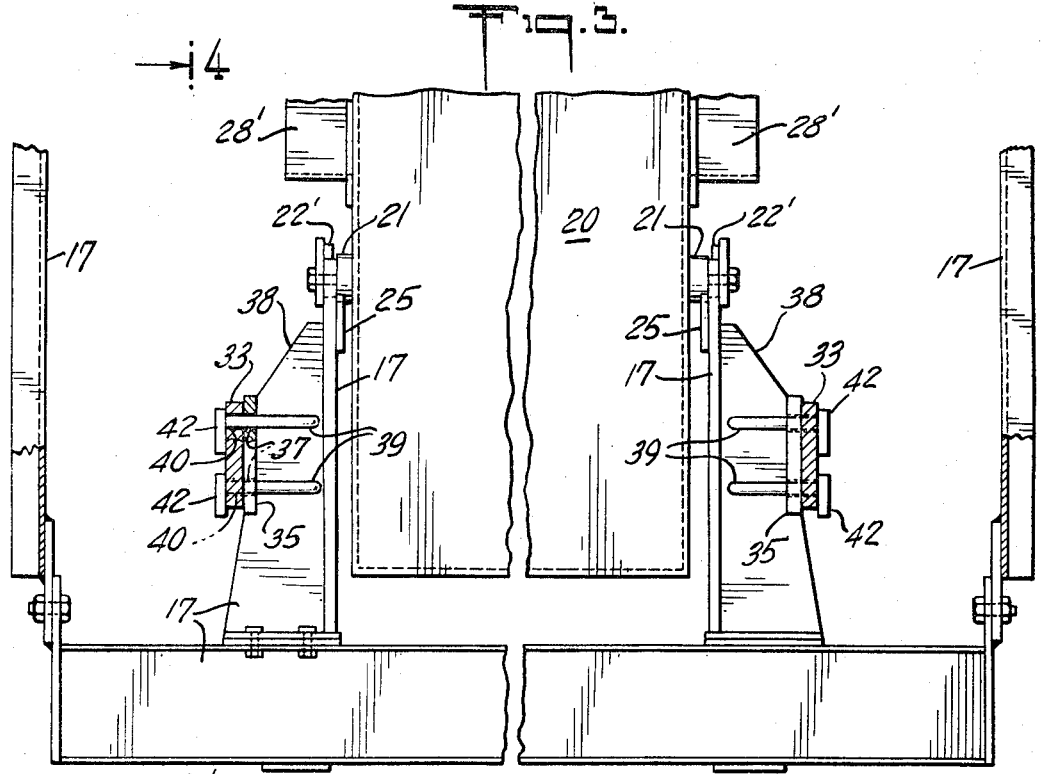
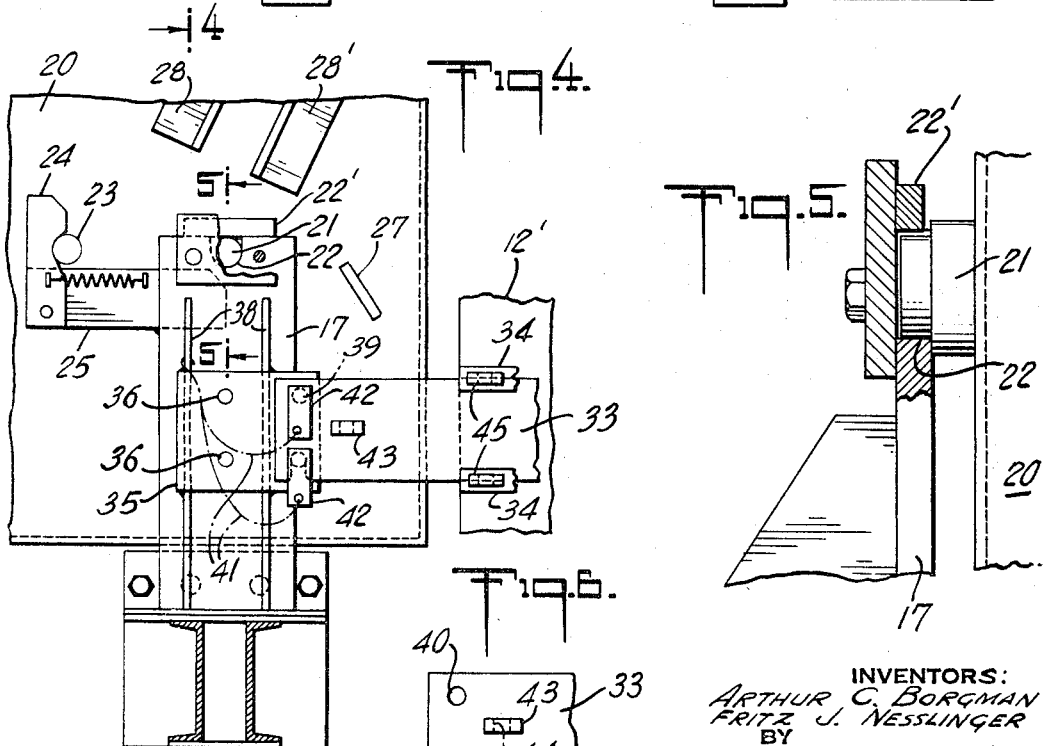

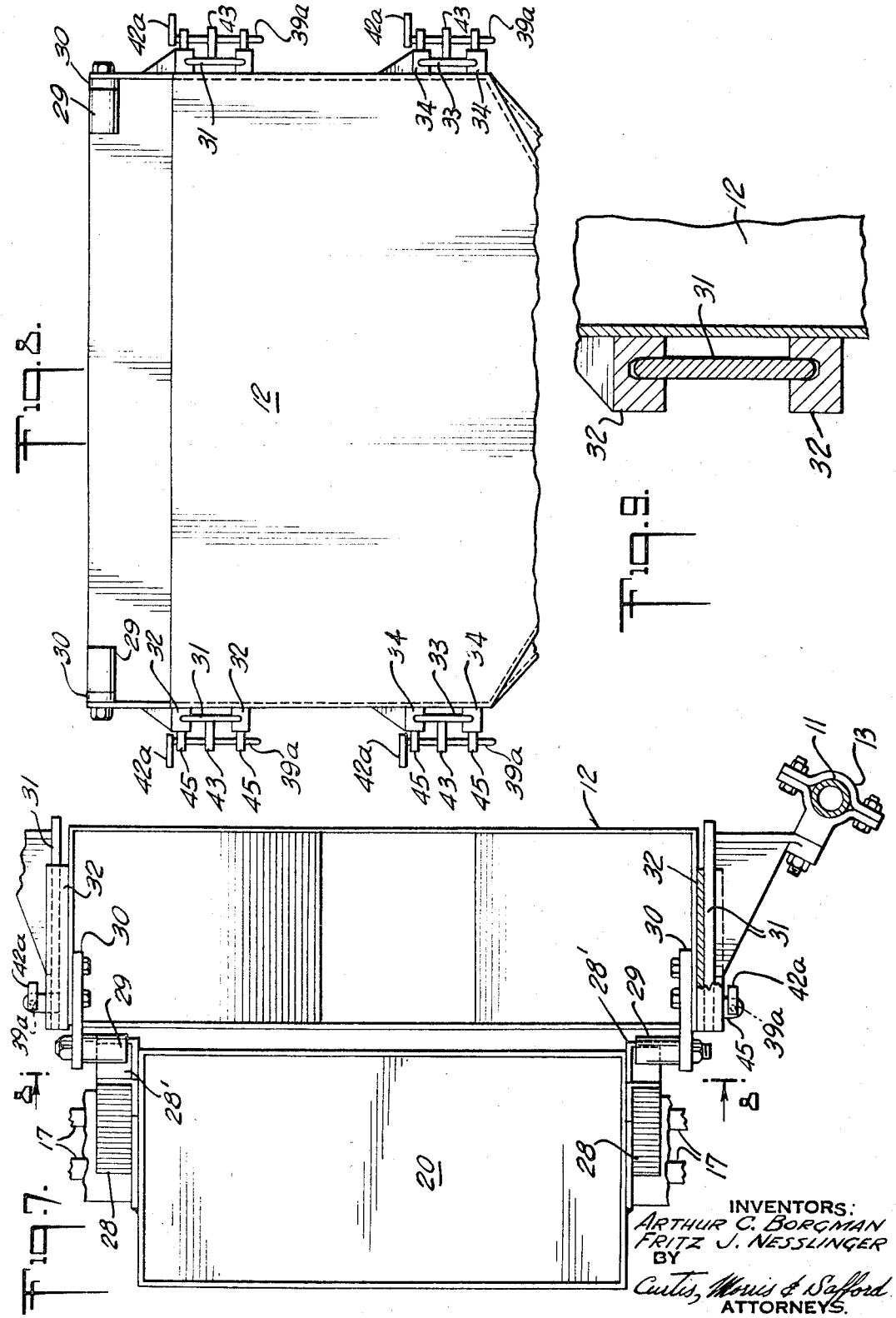

United States Patent Office 3,422,976
Patented Jan. 21, 1969

3,422,976
MATERIAL HANDLING APPARATUS
Fritz J. Nesslinger, College Point, and Arthur C. Borgman, Franklin Square, N.Y., assignors to Harsco Corporation, Wormleysburg, Pa., a corporation of Delaware
Filed Mar. 7, 1967, Ser. No. 621,310
U.S. Cl. 214—622     2 Claims
Int. Cl. B66f 9/06, 9/16

ABSTRACT OF THE DISCLOSURE

A skeleton type material hoisting tower includes a hopper and chute assembly adjustable to different operative positions therein. A cable supported bucket is operatively mounted in the tower for carrying material to and dumping it into the hopper. Automatic dumping is effected by operative engagement of a track or guide on the bucket with roller means on the hopper. To shift the hopper vertically from one operative position to another, it is releasably coupled to the bucket. While the hopper is in mobile relation to the tower and coupled to the bucket, said hopper is moved to a desired new position by raising or lowering the bucket, securing the hopper in the desired operative position, and releasing the coupling between bucket and hopper.

---

The present invention relates to material handling apparatus more particularly of the type wherein material, as concrete for example, is hoisted in a bucket and discharged into the open end of a chute or hopper; and this application is in some respects a continuation-in-part of our application, Ser. No. 524,803, filed Feb. 3, 1966 Patent No. 3,373,887 issued Mar. 19, 1968.

Known apparatus for a similar purpose has embodied a hopper open at its top end which may be releasably secured at different positions vertically along a skeleton type tower, and a bucket which, after loading, can be hoisted into position for automatically discharging its contents into said open end of the hopper.

In general an embodiment of our invention as employed in material handling apparatus for installation and operation in hoisting towers includes an open top hopper which may be releasably mounted at any desired level in a tower, a material carrying bucket pivotally supported in a frame and means for raising and lowering the hopper along with said frame and the bucket. Said hopper is provided with slidable arms at its sides having means at their inner ends for releasable coupling with the bucket frame; and clamping means are carried at the outer ends of said arms for releasable connection with upright elements of the tower. Said hopper also carries at its sides supplemental arms having clamping means at their outer ends for releasably engaging upright elements of the tower to support the hopper while the inner ends of the coupling arms are being connected to and disconnected from the bucket frame and the outer end clamps thereof are engaged with and disconnected from said upright elements to permit vertical re-positioning of the hopper in the tower along with vertical travel of the bucket and frame.

Other objects and distinctive features of our invention not above referred to will appear in the following description and claims and in the accompanying drawings wherein we have shown a preferred embodiment of our invention and have described the same in this specification.

In the drawings:

FIG. 1 is a view generally in side elevation showing portions of uprights or posts of a quadrangular skeleton type tower, a hopper releasably secured thereon, a bucket supporting frame and means for raising and lowering said frame in relation to the hopper, and slidable connector arms on the hopper having means at their inner ends for releasable connection with said frame and clamps at their outer ends for releasable connection with posts or uprights of the tower.

FIG. 2, a fragmentary detail on enlarged scale and partly in transverse section on the line 2—2 of FIG. 1;

FIG. 3, a fragmentary detail on enlarged scale and partly in vertical section on the line 3—3 of FIG. 14;

FIG. 4, a fragmentary detail partly in vertical section on the line 4—4 of FIG. 3;

FIG. 5, a fragmentary detail in vertical section on the line 5—5 of FIG. 4;

FIG. 6, a fragmentary detail in elevation of an end portion of a slidable connector bar or arm for releasably interlocking the hopper with the bucket;

FIG. 7, a top plan view showing the open top ends of the hopper and the bucket;

FIG. 8, a view in elevation showing a portion of the hopper taken from the line 8—8 of FIG. 7;

FIG. 9, a fragmentary detail view in vertical section showing a supplemental arm or bar and supporting guide brackets;

FIG. 10, a view in elevation of the hopper and the bucket with slidable connector arms or bars of the hopper released from the tower upright and operatively engaged with the bucket supporting frame; and FIG. 11 is a view similar to FIG. 10 showing the hopper disengaged from the tower structure and being moved upwardly with upward movement of the frame and bucket to a new operative position in said tower.

Referring to the drawings, apparatus embodying the present invention and adapted for handling concrete is advantageously mounted to operate in a skeleton type quadrangle tower represented in FIG. 1 by uprights or posts 10 at the left and 11 at the right. A concrete receiving hopper 12 and chute 12' assembly is releasably secured to posts 11 by clamps 13 and 14 engaging said posts during pouring operations. A discharge conduit 15 is hinged at 16 to the bottom end of chute 12'.

A frame 17 having guide shoes 17', FIGS. 1 and 2, at each side is guided on vertical tracks 18, one at each side of the tower, and is raised and lowered therein by a cable 19 and hoisting mechanism not shown.

Said frame 17 mounts a concrete carrying bucket 20 pivoted to tilt toward and from hopper 12 and having trunnions 21 (FIG. 10) supported in bearing notches 22 in said frame 17, where it is retained by suitable keepers, as plates 22', FIG. 5, extending across said bearing recesses or notches 22.

From the foregoing it appears that bucket 20 tiltably mounted on frame 17 is raised and lowered in normal operation by said cable 19 to carry supplies of concrete or the like upwardly from a load receiving lower position to discharge the same into the open upper end of said hopper 12 and thence through chute 12' and hinged conduit 15.

Inasmuch as skeleton type hoisting towers are commonly employed in connection with the erection of multistory buildings using concrete in their construction, provision is made for moving the hopper-chute assembly to and from any desired level or operative position in the tower where it is releasably secured by said clamps 13 and 14 and connecting devices including arms 31 and 33 slidably mounted in horizontal guides 32 and 34, respectively. To thus move said assembly from and to different operative positions or levels, means are also provided for temporarily connecting it in a manner to be raised or lowered along with the frame and bucket assembly. Accordingly, the connecting or coupling arms 33, FIGS. 1 and 8, are slidable horizontally between cooperating vertically spaced guides 34, mounted at each side of said hopper-chute assembly and carry clamps 14 at their outer ends whereby they may be releasably connected to said posts 11 and means at their inner ends for releasable connection with frame 17.

As seen in FIGS. 1 and 7, each supplemental arm 31 is in extended position, or such as to permit clamp 13 to be closed around post 11. The same is true of each connector arm 33 and clamp 14, so that hopper 12 and cooperating parts are thus releasably secured in position to receive material dumped or discharged from bucket 20.

When it is desired to discharge the cement or other material at a different level in the tower, clamp 14 is loosened from post 11 and the lower or connector arm 33 is moved rearwardly in guides 34 to bring its inner end into the position shown more clearly in FIG. 4 where said end overlaps a plate 35 having holes 36 and 37, said plate being advantageously welded to outer upright edges of spaced buttress plates 38 forming part of frame 17. With the arm 33 in this position, coupling pins 39 are pushed through holes 40 in said arm and into holes 37 horizontally coaxial therewith in plate 35. This arrangement, in effect locks the hopper-chute assembly to frame 17 so that, when said assembly is released from the tower posts as by loosening clamps 13, and said conduit 15 is arranged as seen in FIG. 11, and said frame 17 is raised or lowered, said assembly is raised or lowered in like degree.

While the hopper-chute unit is supported in effect by lower arm 33, clamp 13 is disconnected from post 11 and supplemental arm 31 is brought approximately into the pendent position shown in FIGURE 11 or so that clamp 13 and outer end portions of said arms 31 are positioned to avoid collision or contact with structural elements of the tower during vertical movement of the hopper-chute unit.

When the hopper and chute unit is brought to the desired level, clamps 13 on arms 31 are closed around post 11. Coupling pins 39 are withdrawn from holes 37 and 40 and arms 33 are extended outwardly so that their inner ends disengage plate 35; and clamps 14 at their outer ends are closed around post 11, thus bringing the parts into substantially their load receiving and carrying positions as seen in FIG. 1.

As seen in FIG. 6, the lower one of holes 40 in each arm 33 may advantageously be in the form of a notch. Also, arms 31 and 33 are provided with lugs 43 having holes 44 which, when said arms are in the positions shown in FIG. 1, are vertically coaxial with similar holes in lugs 45 extending from guides 32 and 34. Thus, said arms 31 and 33 are held in said FIG. 1 position by pins 39a extending through the holes in said lugs 43 and 45 and being provided with heads 42a.

The holes 36 in plate 35, FIG. 4, are adapted to receive the shank portions of coupling pins 39 when the latter are out of use. Advantageously said pins are provided with tethers 41 of tough durable material, one end of each thereof being secured to a buttress plate 38 and the other end to the head 42 of a pin 39 thereby reducing the likelihood of loss of said pins,

We claim:
1. Material handling apparatus wherein a bucket open at its top end is mounted in a hoisting tower in operative relation to a hopper which is open at its top end and releasably and adustably mounted in said tower and means including a frame carried on a hoisting cable are provided for supporting and moving said bucket from and toward load receiving position and toward and from load discharging position in relation to said hopper and for moving said hopper when in released condition vertically along with said bucket, said apparatus including the improvement which comprises means for releasably connecting the hopper to the frame thereby permitting the hopper to be moved between said different material receiving locations in the tower, said connecting means including a connector arm slidable longitudinally on the hopper, means at the outer end of said arm for releasably securing said arm to a portion of the tower, means on the inner end of said arm for releasably securing said arm to said frame, said last mentioned means including a coupling pin extending through opposed coaxially arranged holes in said arm and in a portion of said frame, respectively.

2. Material handling apparatus wherein a hopper mounted in a tower is positioned to receive material discharged from an elevator and means are provided for moving said elevator vertically in said tower and for releasably connecting the hopper to the elevator thereby permitting the hopper to be moved by said elevator between different material receiving locations in the tower, said connecting means including a connector arm slidable longitudinally on the hopper toward and from the elevator, means at the outer end of said arm for releasably securing said arm to a portion of the tower, means on the inner end of said arm for releasably coupling said arm to said elevator, said last mentioned means including a coupling pin extending through opposed couples receptors in said arm and in a portion of said elevator, respectively, and supplementary arms on the hopper having clamps at their outer ends arranged and adapted to be releasably secured to portions of the tower thereby to support the hopper therein while said connector arm is being secured to and released from the tower and said elevator.

References Cited

UNITED STATES PATENTS

| | | | |
|---|---|---|---|
| 1,168,947 | 1/1916 | Levalley | 214—628 |
| 1,299,261 | 4/1919 | Taylor | 214—705 X |
| 1,370,226 | 3/1921 | Rosener | 214—715 X |
| 1,909,379 | 5/1933 | Sangers | 214—715 |
| 2,440,495 | 4/1948 | Wagner et al. | 214—630 |
| 2,545,170 | 3/1951 | Saunders | 214—705 |
| 2,808,165 | 10/1957 | Weisz | 214—630 |

HUGO SHULZ, *Primary Examiner.*

U.S. Cl. X.R.

214—711